US009124118B2

(12) United States Patent
Klemm et al.

(10) Patent No.: US 9,124,118 B2
(45) Date of Patent: Sep. 1, 2015

(54) CIRCUIT FOR A SMALL ELECTRIC APPLIANCE WITH AN ACCUMULATOR AND METHOD FOR MEASURING A CHARGING CURRENT

(75) Inventors: Torsten Klemm, Eschborn (DE); Leo Faranda, Rodgau (DE); Kervin Heinrich Küchler, Darmstadt (DE)

(73) Assignee: BRAUN GMBH, Kronberg (DE)

( * ) Notice: Subject to any disclaimer, the term of this patent is extended or adjusted under 35 U.S.C. 154(b) by 144 days.

(21) Appl. No.: 13/612,977

(22) Filed: Sep. 13, 2012

(65) Prior Publication Data

US 2013/0069565 A1   Mar. 21, 2013

(30) Foreign Application Priority Data

Sep. 16, 2011  (EP) .................................... 11007660
Jun. 29, 2012  (EP) .................................... 12004883

(51) Int. Cl.
*H02P 1/00* (2006.01)
*H02J 7/00* (2006.01)
*H02J 7/02* (2006.01)

(52) U.S. Cl.
CPC ............... *H02J 7/0068* (2013.01); *H02J 7/022* (2013.01); *Y10T 307/406* (2015.04)

(58) Field of Classification Search
USPC .......... 318/139, 494, 501, 504; 320/125, 127, 320/136, 148, 162, 165
See application file for complete search history.

(56) References Cited

U.S. PATENT DOCUMENTS

| 4,562,398 | A | * | 12/1985 | Kotlarewsky | ................. | 320/157 |
|---|---|---|---|---|---|---|
| 4,709,202 | A | * | 11/1987 | Koenck et al. | ................. | 320/112 |
| 5,453,677 | A |   | 9/1995 | Sakoh et al. | | |
| 5,602,448 | A | * | 2/1997 | Yaguchi | ........................ | 318/139 |
| 5,691,078 | A | * | 11/1997 | Kozaki et al. | ................. | 324/428 |
| 5,703,447 | A | * | 12/1997 | Higuchi | ........................ | 318/139 |
| 5,710,506 | A |   | 1/1998 | Broell et al. | | |
| 5,859,524 | A | * | 1/1999 | Ettes | .............................. | 320/132 |
| 5,990,664 | A | * | 11/1999 | Rahman | ........................ | 320/136 |
| 6,107,802 | A | * | 8/2000 | Matthews et al. | ............. | 324/427 |
| 6,310,449 | B1 | * | 10/2001 | Dorfer | ........................ | 318/139 |
| 6,956,487 | B2 |   | 10/2005 | Hermann et al. | | |
| 7,471,067 | B2 |   | 12/2008 | Tamezane et al. | | |
| 7,999,516 | B2 |   | 8/2011 | Hartular et al. | | |
| 2009/0179614 | A1 | * | 7/2009 | Klemm et al. | ................. | 320/108 |
| 2011/0025272 | A1 |   | 2/2011 | Nagashima et al. | | |
| 2011/0084662 | A1 |   | 4/2011 | Yang et al. | | |

FOREIGN PATENT DOCUMENTS

| DE | 40 11 790 A1 | 10/1991 |
|---|---|---|
| DE | 198 38 137 A1 | 3/2002 |
| DE | 696 19 912 T2 | 11/2002 |
| DE | 698 05 378 T2 | 11/2002 |

(Continued)

*Primary Examiner* — Bentsu Ro
*Assistant Examiner* — Thai Dinh
(74) *Attorney, Agent, or Firm* — Vladimir Vitenberg

(57) ABSTRACT

A circuit for a small electric appliance is disclosed. The circuit includes a battery (B); a control circuit (uC) for measuring the charging current of the battery (B); a DC-DC converter (DC/DC) which supplies the control circuit (uC) from the battery; and a current sensing resistor (R1), whose one end lies at a reference potential and whose other end is connected to the battery (B). The control circuit (uC) has a terminal which is at reference potential, and a measurement input which is related to the reference potential.

10 Claims, 1 Drawing Sheet

(56) References Cited

FOREIGN PATENT DOCUMENTS

| | | |
|---|---|---|
| DE | 696 20 929 T2 | 12/2002 |
| DE | 697 24 917 T2 | 7/2004 |
| DE | 10 2004 057 239 A1 | 6/2006 |
| DE | 697 36 730 T2 | 8/2007 |
| DE | 698 36 403 T2 | 9/2007 |
| EP | 0 122 473 A1 | 10/1984 |
| EP | 0 226 253 A1 | 6/1987 |
| EP | 0 448 745 A1 | 10/1991 |
| EP | 0 723 326 A2 | 7/1996 |
| EP | 0 561 257 B1 | 10/1996 |
| EP | 0 820 138 A2 | 1/1998 |
| EP | 1 069 672 A2 | 1/2001 |
| EP | 0 735 642 B1 | 1/2003 |
| EP | 0 846 362 B1 | 9/2003 |
| EP | 0 875 978 B1 | 3/2007 |
| JP | 2002-2223529 A | 8/2002 |
| JP | 2009-296873 A | 12/2009 |
| WO | WO 02/15374 A1 | 2/2002 |

* cited by examiner

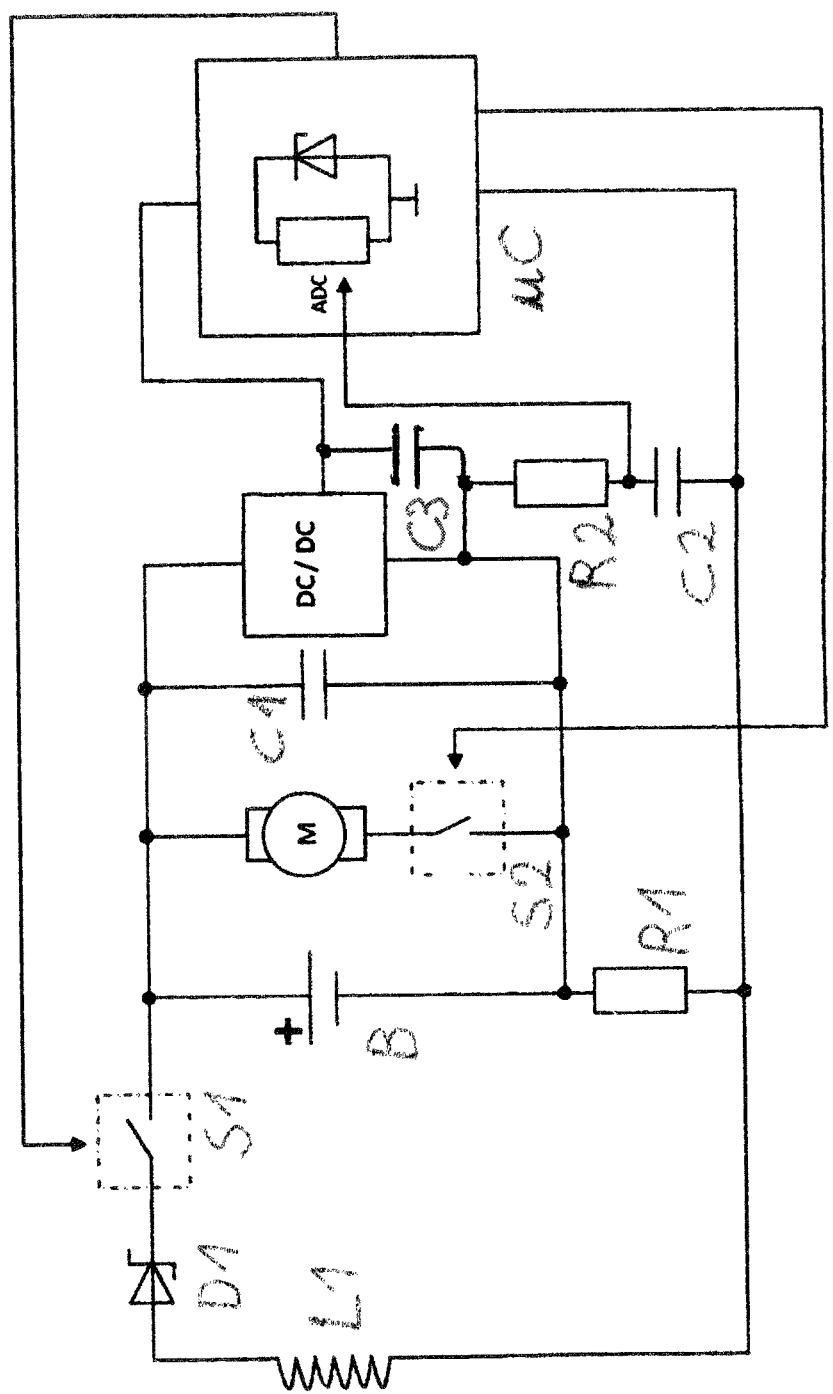

CIRCUIT FOR A SMALL ELECTRIC APPLIANCE WITH AN ACCUMULATOR AND METHOD FOR MEASURING A CHARGING CURRENT

CROSS REFERENCE TO RELATED APPLICATION

This application claims the benefit of European Patent Convention Application No. 11007660.1, filed Sep. 16, 2011, the substance of which is incorporated herein by reference in its entirety.

FIELD OF THE INVENTION

The present disclosure is directed to a circuit for a battery-operated small electric appliance. Additionally, the present disclosure is directed to a method for measuring the charging current of the accumulator.

BACKGROUND OF THE INVENTION

Battery-powered electric appliances with a control circuit will need a DC-DC converter to supply the control circuit when the battery voltage is not sufficiently high to supply the control circuit, for example, because the accumulator has only one cell. If the control circuit is used for measuring the charging current of the accumulator, the measured value for the charging current is distorted by the current consumption of the DC-DC converter and any other loads.

There however exists a need for a method for measuring a charging current and a simple circuit for a battery-operated small electric appliance which enables a sufficiently accurate measurement of the charging current of the accumulator.

SUMMARY OF THE INVENTION

In one embodiment, a circuit for a small electric appliance is provided. The circuit includes a battery (B); a control circuit (uC) for measuring the charging current of the battery (B); a DC-DC converter (DC/DC) which supplies the control circuit (uC) from the battery; and a current sensing resistor (R1), whose one end lies at a reference potential and whose other end is connected to the battery (B). The control circuit (uC) has a terminal which is at reference potential, and a measurement input which is related to the reference potential.

In another embodiment, a method for measuring a charging current of a battery is provided. The method includes providing a current sensing resistor (R1) and a control circuit (uC); and supplying the control circuit (uC) from a DC-DC converter (DC/DC) and at least one further load from the battery (B). The control circuit (uC) measures the charging current only when the at least one further load is switched off or the control circuit (uC) provides the measured charging current with at least one correction value when the at least one further load is not switched off during the current measurement.

These and other features, aspects and advantages of specific embodiments will become evident to those skilled in the art from a reading of the present disclosure.

BRIEF DESCRIPTION OF THE DRAWINGS

The embodiment set forth in the drawing is illustrative in nature and not intended to limit the invention defined by the claims. The following detailed description of the illustrative embodiments can be understood when read in conjunction with the following drawing, where like structure is indicated with like reference numerals and in which:

FIG. 1 is a drawing of a circuit according to one embodiment as shown and described herein.

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

According to the present disclosure, a method for measuring a charging current and a simple circuit for a battery-operated small electric appliance which enables a sufficiently accurate measurement of the charging current of the accumulator is provided.

According to one embodiment, a control circuit for measuring the charging current of a battery is powered by a DC-DC converter from the battery. A current sensing resistor is with its one end at a reference potential and is connected with its other end to the battery. The control circuit may have a terminal which is at reference potential, and a measurement input which is related to with the reference potential. In this embodiment, the circuit, the DC-DC converter is thus not at the reference potential. In one embodiment, the measuring input of the control circuit is connected via a low pass filter to the other end of the current sensing resistor.

In one embodiment, the circuit may be suitable for a battery-operated small electrical appliance, such as an electric toothbrush or an electric shaver, the accumulator of which has only one cell, and therefore the battery voltage must be increased by the DC-DC converter to a voltage sufficient for the control circuit and optionally other loads.

In one embodiment, a small electric appliance at least one further load is present, for example, a display device, which lies at reference potential, which is controllable by the control circuit, and which is supplied from the DC-DC converter. In this embodiment, the control circuit measures the charging current only when it has switched off the at least one further load, or the control circuit provides the measured value for the charging current with at least one correction value when the at least one further load is not disabled. It is assumed that the current consumption of the additional loads is known, and corresponding correction values are stored in the control circuit.

In another embodiment, the small electric appliance may further include an electric motor which is connected to the battery via a controllable switch controlled by the control circuit. Since the motor current does not flow through the current sensing resistor, it does not distort the measurement of the charging current.

A method for measuring a charging current of an accumulator with a circuit in which the battery voltage is increased by a DC-DC converter to a voltage sufficient for a control circuit for measuring the charging current and optionally other loads is characterized in that the control circuit measures the charging current only when the at least one further load is switched off or the control circuit provides the measured charging current with at least one correction value when the at least one further load is not switched off during the current measurement. The method may be used with a small electric appliance, including the circuit described above.

The circuit illustrated in FIG. 1 has a charging coil L1, which is connected to a battery B via a diode D1, a first controllable switch S1 and a current sensing resistor R1. One end of the charging coil L1 is connected to the anode of the diode D1. The other end of the charging coil L1 serves as a reference potential and is connected via the current sensing resistor R1 to the negative pole of the battery B. The cathode of diode D1 is connected to the first controllable switch S1. Parallel to the battery B, a capacitor C1 and a series circuit of an electric motor M and a second controllable switch S2 is connected. Further, a DC-DC converter DC/DC is connected to the battery B. The DC-DC converter DC/DC has an output terminal to which the one end of a third capacitor C3 is connected. The other end of the third capacitor C3 is connected to the negative terminal of battery B. A control circuit uC has two terminals for its power supply, one of which is connected to the output of the DC-DC converter DC/DC and the other is connected to reference potential. The control circuit uC further has an input which is connected to the reference potential via a second capacitor C2 and is connected to the negative terminal of the battery B via a second resistor R2, and two outputs, one of which is connected to the first controllable switch S1 and the other is connected to the second controllable switch S2. As is shown in FIG. 1, the DC-DC converter DC/DC supplies power to the control circuit uC from the battery B in series with the battery B and the current sensing resistor R1.

The operation of this circuit will be explained below. While charging the battery B the control circuit uC measures the charging current, i.e. the voltage at the current sensing resistor R1 via a low-pass filter (second capacitor C2, second resistor R2). The control circuit integrates the measured charging current in a conventional manner over time, for example, by a counter, and terminates the charging by corresponding activation of the first controllable switch S1 when the battery is fully charged. It can be taken into account that the measurement of the charging current is falsified by the current consumption of the control circuit. When further loads are connected to the control circuit or when further loads controlled by the control circuit are connected to the DC-DC converter, for example, a display device not shown in FIG. 1, the current consumed by these further loads is either also taken into account during the measurement of the charging current, or the measurement of the charging current takes place only from time to time, and the further loads will be switched on only if no measurement takes place. Since neither the motor current nor the current of the DC-DC converter flow through the current sensing resistor R1, these currents do not distort the measurement.

The circuit has the advantage that the resistance of the current sensing resistor R1 may be very small because both the current sensing resistor R1 and the control circuit uC are at reference potential (no difference measurement required), and therefore the control circuit uC can comprise at its input an A/D converter which can be operated with a correspondingly small reference voltage, so that a high measuring accuracy is obtained.

In one embodiment, the control circuit uC may be implemented in a microcontroller.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A circuit for a small electric appliance, comprising:
   a battery having a negative terminal and a positive terminal;
   a current-sensing resistor sensing a charging current;
   a control circuit measuring the charging current of the battery;
   a DC-DC converter directly connected to the battery such that the DC-DC converter is directly connected to both the negative terminal of the battery and the positive terminal of the battery, wherein the DC-DC converter supplies power to the control circuit from the battery; and
   wherein the control circuit has a measurement input (ADC) which is related to a reference potential, wherein the reference potential is connected via the current-sensing resistor (R1) to the negative terminal of the battery.

2. The circuit according to claim 1, wherein the measuring input of the control circuit (uC) is connected to the other end of the current sensing resistor (R1) via a low pass filter (R2, C2).

3. The circuit according to claim 1, wherein at least one further load is provided which is connected to reference potential, which is controllable by the control circuit (uC), and which is powered by the DC-DC converter (DC/DC).

4. The circuit according to claim 3, wherein the control circuit (uC) measures the charging current only when the at least one further load is switched off.

5. The circuit according to claim 3, wherein the control circuit (uC) provides the measured charging current with at least one correction value when the at least one further load is not switched off.

6. A small electrical appliance comprising the circuit according to claim 1.

7. The small electric appliance according to claim 6, further comprising an electric motor (M) which is connected to the battery (B) via a controllable switch (S2) controlled by the control circuit (uC).

8. A method for measuring a charging current of a battery having a positive terminal and a negative terminal, the method comprising:
   providing a current-sensing resistor and a control circuit;

providing a DC-DC converter directly connected to the battery such that the DC-DC converter is directly connected to both the negative terminal of the battery and the positive terminal of the battery, the converter supplying power to the control circuit from the battery;

supplying power to the control circuit from the DC-DC converter and at least one further load from the battery, wherein the control circuit has a measurement input to a reference potential that is connected via the current-sensing resistor to the negative terminal of the battery.

9. A circuit for a small electric appliance, comprising:

a battery having a negative terminal and a positive terminal;

a current-sensing resistor sensing a charging current;

a control circuit measuring the charging current of the battery;

a DC-DC converter directly connected to the battery, wherein the DC-DC converter supplies power to the control circuit from the battery in series with the battery and the current-sensing resistor; and wherein the control circuit has a measurement input (ADC) which is related to a reference potential, wherein the reference potential is connected via the current-sensing resistor (R1) to the negative terminal of the battery, and wherein neither the motor current nor the current of the DC-DC converter flows through the current-sensing resistor R1.

10. The circuit according to claim 9, wherein the DC-DC converter is directly connected to both the negative terminal of the battery and the positive terminal of the battery.

* * * * *